(12) United States Patent
Weiler et al.

(10) Patent No.: US 8,863,370 B2
(45) Date of Patent: Oct. 21, 2014

(54) WINDSHIELD WIPER APPARATUS

(75) Inventors: Michael Weiler, Buehl (DE); Achim Kraus, Buehl (DE); Stefan Mai, Karlsruhe (DE); Florian Hauser, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 13/503,600

(22) PCT Filed: Aug. 23, 2010

(86) PCT No.: PCT/EP2010/062216
§ 371 (c)(1),
(2), (4) Date: Jul. 9, 2012

(87) PCT Pub. No.: WO2011/047905
PCT Pub. Date: Apr. 28, 2011

(65) Prior Publication Data
US 2012/0266402 A1  Oct. 25, 2012

(30) Foreign Application Priority Data

Oct. 21, 2009 (DE) .......................... 10 2009 045 879
May 19, 2010 (DE) .......................... 10 2010 029 105

(51) Int. Cl.
*B60S 1/06* (2006.01)
*B60S 1/04* (2006.01)
(52) U.S. Cl.
CPC .................................. *B60S 1/0425* (2013.01)
USPC ......... 29/517; 15/250.3; 15/250.31; 403/274; 29/508; 29/515; 29/516; 29/407.05
(58) Field of Classification Search
USPC ......... 15/250.3, 250.31, 250.27; 29/508, 510, 29/515, 516, 517; 403/274; 72/20.1–21.6, 72/367.1, 368, 370.1
See application file for complete search history.

(56) References Cited

U.S. PATENT DOCUMENTS 1,703,037 A * 2/1929 Heck .............................. 228/136
4,269,438 A * 5/1981 Ridenour .................... 285/382.2

(Continued)

FOREIGN PATENT DOCUMENTS

| CN | 1816471 | 8/2006 |
| CN | 1878690 | 12/2006 |
| EP | 1862361 | 12/2007 |
| FR | 2775455 | 9/1999 |

(Continued)

OTHER PUBLICATIONS

WO2008071515A1 (machine translation), 2008.*

(Continued)

*Primary Examiner* — Mark Spisich
*Assistant Examiner* — Andrew A Horton
(74) *Attorney, Agent, or Firm* — Michael Best & Friedrich LLP

(57) ABSTRACT

The invention relates to a windscreen wiper apparatus for a motor vehicle, having a wiper motor and having at least one wiper bearing in which a wiper shaft is mounted, it being possible to drive said wiper shaft by means of the wiper motor in order to operate a wiper arm which is connected to the wiper shaft, wherein the wiper bearing has a bearing pin (4) for holding a tubular support (1), it being possible for said bearing pin to be fixed to the tubular support (1) by means of a crimp, characterized in that the bearing pin (4) has an outer contour (5) which is already formed, at least in a region of overlap with the crimp, so as to correspond to an inner contour (3) of the crimped tubular support (1), before the crimp is introduced, and also to a method for producing said windscreen wiper apparatus.

7 Claims, 3 Drawing Sheets

(56) References Cited

U.S. PATENT DOCUMENTS

| | | | |
|---|---|---|---|
| 4,330,924 A * | 5/1982 | Kushner et al. | 29/458 |
| 5,142,941 A * | 9/1992 | Amann et al. | 74/606 R |
| 5,372,449 A * | 12/1994 | Bauer et al. | 403/273 |
| 6,343,403 B1 * | 2/2002 | Kanazawa | 15/250.3 |
| 6,718,593 B2 * | 4/2004 | Shido | 15/250.31 |
| 7,222,386 B2 * | 5/2007 | Nakamura | 15/250.31 |
| 7,249,394 B2 * | 7/2007 | Iwata | 15/250.27 |
| 2006/0207049 A1 * | 9/2006 | Powell, Jr. | 15/250.27 |
| 2008/0120844 A1 * | 5/2008 | Yang et al. | 29/897.2 |
| 2009/0271939 A1 * | 11/2009 | Benner et al. | 15/250.31 |

FOREIGN PATENT DOCUMENTS

| | | | | |
|---|---|---|---|---|
| FR | 2783477 | 3/2000 | | |
| WO | WO 2004016481 A1 * | 2/2004 | | B60S 1/34 |
| WO | 2005044648 | 5/2005 | | |
| WO | WO 2008071515 A1 * | 6/2008 | | B60S 1/04 |

OTHER PUBLICATIONS

WO2004016481A1 (machine translation), 2004.*

PCT/EP2010/062216 International Search Report dated Dec. 17, 2010 (Translation and Original, 6 pages).

* cited by examiner

WINDSHIELD WIPER APPARATUS

BACKGROUND OF THE INVENTION

The present invention relates to a windshield wiper apparatus for a motor vehicle, with a wiper motor and with at least one wiper bearing in which a wiper shaft is mounted, the wiper shaft being drivable by means of the wiper motor in order to actuate a wiper arm connected to the wiper shaft, wherein the wiper bearing has a bearing pin for receiving a tubular support, said bearing pin being fixable to the tubular support by means of a crimp, and to a method for the production of said windshield wiper apparatus.

Windshield wiper apparatuses of this type are known in general. During the crimping operation, the components to be fixed to one another are exposed to a very large deformation force in order to produce an interlocking connection between the bearing pin and the tubular support. In the process, in addition to the tubular support, regions of the material of the bearing pin are also plastically deformed in order to obtain an appropriately interlocking connection between the tubular support and the bearing pin. However, this may result in the material of the bearing pin being exposed to very large stresses precisely in the region of the crimp of the connection partners, which may result in adverse effects on the structure of the material or even in material fatigue.

In order to reduce the force to be applied during the crimping in order to ensure an interlocking connection between the bearing pin and tubular support, it is proposed in the prior art to form crimping pockets, for example, on two mutually opposite side regions of the bearing pin in the region of overlap with the tubular support which is to be plugged onto said bearing pin and is to be fastened thereto, the geometrical dimensions of which crimping pockets substantially correspond to the dimensions of the crimping tools. After the tubular support has been plugged on, the crimping tools are actuated such that subsections of the tubular support are moved into the crimping pockets in the bearing pin and are plastically deformed for fixing to the bearing pin. For this purpose, the tubular support, for example a steel tube, is deformed from the outside by the crimping tools, in particular by the crimping punches thereof, in such a manner that said support is moved by a type of deep drawing into the crimping pockets and forms an interlocking connection with the crimping pockets in the bearing pin.

A disadvantage of this method is that, due to the plastic deformation of the tubular support, a very great material loading of the bearing pin occurs precisely in the edge regions of the crimping pockets in the bearing pin. This results in stress peaks which may result in internal stresses in the respective workpieces or even in fatigue of the heavily loaded material of the bearing pin, and possibly even in the edge regions of the crimping pockets breaking off. Furthermore, a precise alignment of the crimping tools with the crimping pockets is necessary. However, this is very difficult, since, in the fitted state of the bearing pin and tubular support, the crimping pockets formed on the bearing pin are not visible from the outside.

Since the material of the tubular support is generally steel and therefore requires a higher deformation force than the bearing pin material which is inserted thereon and is generally produced from aluminum, zinc or plastic, it is also not possible to measure a significant increase in force upon deformation of the bearing pin during the crimping operation. Force-controlled crimping on the basis of the different material behavior is therefore possible only with difficulty, and therefore a pure displacement control has to be used for the crimping operation, which is associated with a further increased risk of introducing stress peaks into the bearing pin, in particular in the event of excessive crimping forces.

It is therefore the object of the present invention to provide a windshield wiper apparatus and a connecting method, which provide a secure, interlocking connection between the bearing pin and tubular support, also with a reduced application of force and simple handling, and reduce or as far as possible avoid stress peaks in the connection partners.

SUMMARY OF THE INVENTION

This object is achieved according to the invention in that the bearing pin has an outer contour which is formed, at least in a region of overlap with the crimp, so as to correspond to an inner contour of the crimped tubular support.

In other words, the formation of the outer contour of the bearing pin so as to correspond to the inner contour of the tubular support, said inner contour arising after the crimping on account of the crimping-induced deformation of the tubular support, opens up the possibility of controlling the crimping operation in such a manner that, although the tubular support is plastically deformed during the crimping, the bearing pin at the same time undergoes only a material-protecting, elastic deformation. Stress peaks can thus be reduced or even completely prevented at edge regions of the crimps, and the risk of material breaking or of material fatigue of the bearing pin can be significantly reduced.

The forces which are necessary for the deformation and are to be applied to the crimping tools can also be significantly reduced in this manner, which results in substantially greater process accuracy. It is even possible to convert from a pure displacement control of the crimping operation to a force control, since a defined force to be applied for the deformation of the tubular support is virtually exclusively necessary in order to achieve a reliable connection between the tubular support and bearing pin.

Forcible deformation of the bearing pin can be reduced to a minimum and therefore the risk of damage to the bearing pin during the crimping can be reduced by the outer contour of the bearing pin beyond the region of the crimp of the tubular support being matched to the "natural" inner bent shape of the tubular support after the crimping.

In an exemplary embodiment of the present invention, the outer contour of the bearing pin is therefore designed along the entire circumferential surface thereof so as to correspond to the inner contour of the tubular support in the region of the crimp. The tubular support can thus be fitted on the wiper bearing even with large tolerances. It is not necessary to precisely position the crimping tool and to align the connection partners with each other, since the outer contour of the bearing pin is suitable over the entire extent thereof for accommodating the inner structure of the tubular support after the crimping without stress peaks occurring in this region.

The outer contour of the bearing pin can be designed in such a manner that a surface contact between the inner contour of the tubular support and the outer contour of the bearing pin is formed only in the region of a crimping base formed during the crimping, and the tubular support is otherwise spaced apart from the bearing pin. This has the advantage that, over the entire region of the bearing pin, stresses are no longer introduced outside the region of the crimp of the tubular support and to the bearing pin.

In order to improve the flexural rigidity of the bearing pin along and transversely with respect to the axial extent thereof, the outer contour of the bearing pin can have webs along and/or transversely with respect to the axial extent of the bearing pin, which webs are arranged in particular in such a manner that the flexural rigidity is greater in the horizontal extent of the bearing pin than in the vertical extent.

An exemplary embodiment of the present invention makes provision to provide the bearing pin with at least one relief clearance, in particular in the form of a depression, in particular in regions of large stresses which are caused by the connection to the inner contour of the tubular support.

The relief clearance or depression here can be formed in such a manner that an undercut arises in the region of the crimping-induced deformation, in particular in the region of the greatest deformation. The undercut can be selected in such a manner that the bearing pin forms a type of sacrificial geometry in the edge regions of the deformation regions of the tubular support, said sacrificial geometry moving into the depression or relief clearance in the event of excessive crimping forces due to tolerances being exceeded. This results in an increase in the tolerance zone for the crimping operation. From a certain point, it is thus possible, despite crimping forces rising further, to cause an at most slight change in the component geometries, which allows the crimping operation to be formed in a particularly flexible manner.

In one exemplary embodiment of the present invention, the bearing pin has a cross section with a bone or butterfly shape. This choice of the shape affords particularly good dimensional stability of the bearing pin and ensures a good distribution of stresses and therefore an equalization of the stresses in the bearing pin, even in the event of higher crimping forces. If a stepwise crimping is carried out, it can be observed that the tubular support becomes more angular and cantered from step to step. As a result, a contact angle α between the tubular support and bearing pin becomes ever smaller the steeper the flanks of the tubular support become in the crimping region. If the contact angle moves toward 90°, a normal force applied to the bearing pin by the torsional moment becomes ever smaller. In other words, the choice of steeper flanks of the bearing pin in relation to the tubular support improves the absorption of forces and torques. This interrelationship is achieved particularly readily with the abovementioned bone or butterfly structure of the bearing pin.

In order to secure the connection between the tubular support and bearing pin, in one exemplary embodiment of the present invention the bearing pin can have a radially extending, cylindrical bore. After the fitting and the crimping of the tubular support on the bearing pin, it is possible to insert, for example, a bolt in said bore, the bolt locking the tubular support to the bearing pin in this position. For this purpose, openings designed in a complementary manner with respect to said bearing pin can be formed in the tubular support. As an alternative, it is also possible, after the tubular support has been fitted onto the bearing pin, to drive a bolt through the interconnected components.

A further option for stabilizing the connection between the wiper bearing and the tubular support and for designing the fitting to be as little prone to error as possible makes provision for a ring element which is arranged coaxially with respect to the bearing pin to be formed on the wiper bearing in order to push the tubular support onto the bearing pin to stabilize the position of said support and to accommodate the latter in the ring element. Said ring element precisely defines a final position of the tubular support on the bearing pin and wiper bearing, since the base of the ring element can constitute a stop surface of the tubular support on the wiper bearing.

In order to produce a windshield wiper apparatus according to the invention for a motor vehicle, with a wiper motor and with at least one wiper bearing in which a wiper shaft is mounted, the wiper shaft being driven by means of the wiper motor in order to actuate a wiper arm connected to the wiper shaft, wherein the wiper bearing has a bearing pin for receiving a tubular support, which bearing pin is fixed on the tubular support by means of crimping, the following steps are provided for producing a stress-optimized connection between the tubular support and bearing pin:

crimping the tubular support with one or more crimping tools;

determining an inner contour of the tubular support, the inner contour arising as a result of the crimping;

calculating a stress-optimized outer contour of the bearing pin on the basis of the inner contour of the tubular support after the crimping;

producing the bearing pin in such a manner that the bearing pin has an outer contour which is formed, at least in a region of overlap with the crimp, so as to correspond to the inner contour of the crimped tubular support;

pushing the tubular support onto the bearing pin;

crimping the tubular support.

The material loading of the crimping pin and of the tubular support can be kept as small as possible and therefore the service life of the wiper bearing can be increased further by the force acting on the connection between the two components by means of the crimping tool being selected in such a manner that the plastic deformation of the tubular support during the crimping leads to an elastic deformation of the material of the bearing pin. It is thus ensured that a reliable interlocking connection arises between the tubular support and bearing pin and at the same time that the forces acting on the connection partners are minimal.

Furthermore, in one exemplary embodiment of the method according to the invention, in order to avoid stress peaks, at least one relief clearance can be provided in regions of great stresses which may occur on the outer contour of the bearing pin, in particular in the region of the surface contact with the inner contour of the tubular support.

In order to enable as flexible a use of the crimping tools as possible, even for different arrangements of the crimping pockets, for example for fastening the right or left wiper bearing, in one exemplary embodiment two separately adjustable crimping tools can be used. The crimping via at least two separately adjustable crimping tools makes it possible to adapt the crimping to a loading direction of the wiper bearing.

With regard to further advantageous refinements of the present invention, reference is made to the dependent claims and to the attached drawings, which are explained in more detail below.

DETAILED DESCRIPTION

Figure 1:
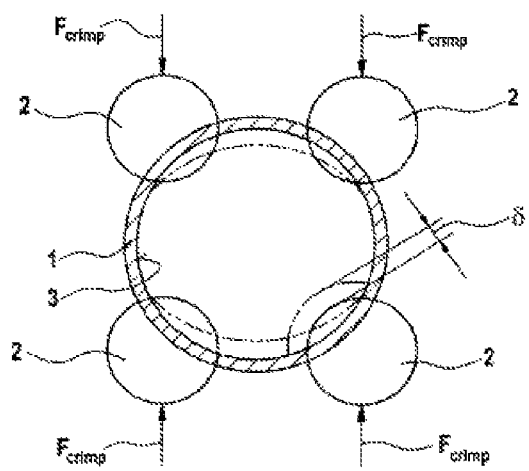
FIG. 1 shows a schematic cross-sectional illustration of a tubular support with a crimping tool having four crimping punches.

FIG. 1 shows a schematic cross-sectional illustration of a tubular support 1 of a windshield wiper apparatus (not illustrated specifically) for a motor vehicle.

A crimping tool which comprises four crimping punches 4 is arranged on the tubular support 1. The crimping punches 2 are arranged in such a manner that a springback is adapted to the crimping-induced deformation of the circular cross section of the tubular support 1, i.e. the springback 6 and the deformation are minimal.

Figure 2:
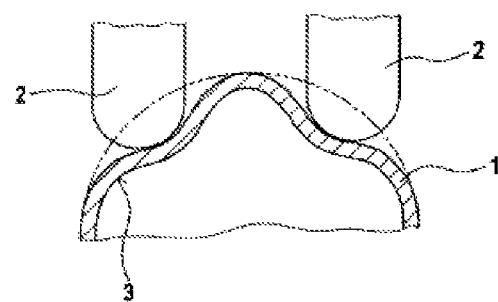
FIG. 2 shows a tubular support according to FIG. 1 after the crimping.

In its original shape, the tubular support 1 has a circular cross-sectional area with an inner contour 3 which, by application of a force $F_{crimp}$ to the crimping punches 2, is deformed in regions such that, after the crimping operation, said inner contour assumes a shape as shown in FIG. 2. According to the prior art, a bearing pin is inserted into the tubular support 1 according to FIGS. 1 and 2, the cross-sectional area of which bearing pin is of substantially circular design and the outer contour of which bearing pin substantially follows the inner contour 3 of the tubular support 1.

Figure 3:
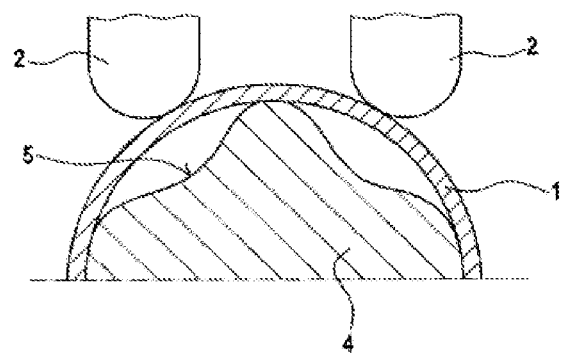
FIG. 3 shows a schematic illustration of a bearing pin, which is inserted into the tubular support, before the crimping.

In the prior art, the deformation forces of the crimping pins 2 result in large stresses in the material of the bearing pin, since the material of the bearing pin is plastically deformed corresponding to the deformation of the inner contour of the tubular support. In order to prevent this, according to the invention, a bearing pin 4 is inserted into the tubular support 1 before the crimping operation, as shown in FIG. 3. An outer contour 4 of the bearing pin 2 is designed in such a manner that said outer contour is formed so as to correspond to the inner contour 3 of the tubular support 1 in the already crimped state.

The formation of the outer contour 4 of the bearing pin 2 so as to correspond to the crimped inner contour 3 of the tubular support 1 even before crimping opens up the possibility of controlling the crimping operation in such a manner that, although the tubular support 1 is plastically deformed during the crimping, during the deformation the bearing pin 2 at the same time undergoes only a substantially material-protecting elastic deformation. Stress peaks at the edge regions of the crimp both in the tubular support 1 and in the bearing pin 2 can thus be reduced or even completely prevented, and the risk of breaking of the material or of material fatigue of the bearing pin 2 can be significantly reduced.

Figure 4:
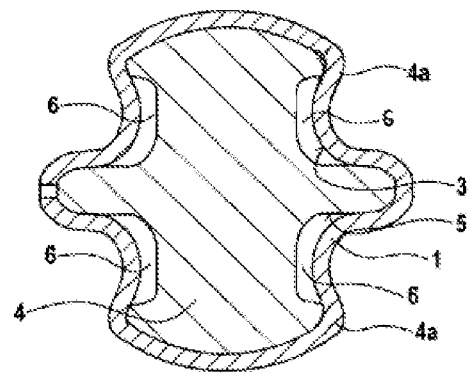
FIG. 4 shows an alternative embodiment of a bearing pin with a bone- and butterfly-shaped cross section.

Particularly good dimensional stability of the bearing pin 4 is achieved by a bearing pin 4 with a cross-sectional area in the shape of a bone or butterfly. This ensures good distribution of stresses within the bearing pin 4 even at higher crimping forces. FIG. 4 shows one such embodiment of a bearing pin 2 with a bone- or butterfly-shaped cross section. The bone- or butterfly-shaped cross section is achieved by relief clearances in the form of depressions 6 being introduced into the bearing pin 4. By means of provision of the depressions 6 in the bearing pin 4, the elastic portion of the deformation of the inner contour 3 of the tubular support 1 is maintained during the crimping, i.e. beyond the crimping connection or a crimping base formed by the inner contour 3 of the tubular support 1 during the crimping, the inner tube geometry 3 of the tubular support 1 does not touch the bearing pin 4 during and after the crimping. This results in no unnecessary stresses being introduced onto the outer contour 5 of the bearing pin 4 and therefore onto the bearing pin material during the crimping. In this exemplary embodiment, the depression 6 results in a type of undercut within the geometry of the bearing pin 4. The undercut here is selected in such a manner that the bearing pin forms a type of sacrificial geometry 4a in the edge regions facing the tubular support 1, said sacrificial geometry being able to move into the depressions 6 or relief clearances in the event of excessive crimping forces due to the crimping force tolerances being exceeded. This achieves the effect that even a significant exceeding of the crimping forces necessary for forming the crimping can be absorbed by a corresponding movement of the sacrificial geometry 4a into the relief clearance 6 and damage to components can be prevented.

In order to increase the effect, the flanks of the bearing pin 4 are selected in relation to the tubular support 1 so as to be oriented as steeply as possible with respect to the geometry of the tubular support 1 after the crimping, in order to improve the absorption of forces and torques.

Figure 5:
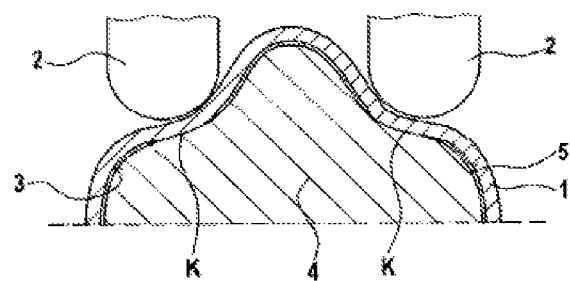
FIG. 5 shows the bearing pin next to the tubular support after the crimping.

As can be seen more precisely in FIG. 5, the force $F_{crimp}$ can be selected in such a manner that a surface contact K arises between the tubular support 1 and the bearing pin 2 only in the region of the crimp, and the tubular support 1 is otherwise spaced apart from the bearing pin 2.

Figure 6:
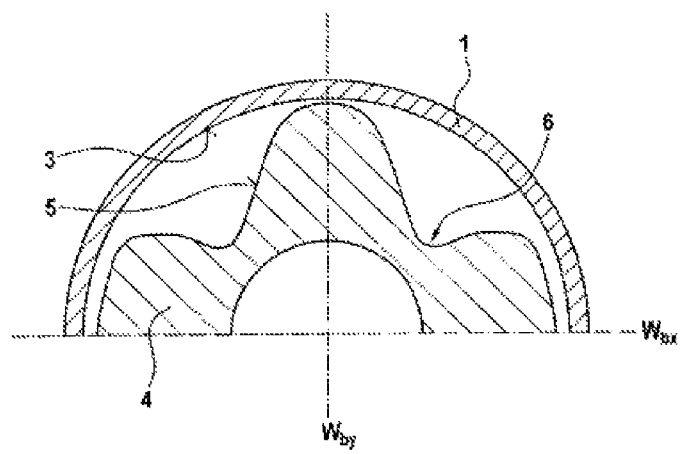
FIG. 6 shows a further bearing pin according to the invention in a tubular support before the crimping.

In order to obtain a purely interlocking connection between the tubular support 1 and bearing pin 4, in an alternative exemplary embodiment of the present invention according to FIG. 6, on the bearing pin 4, in order to avoid stress peaks between the two connection partners due to the deformation of the inner contour 3 along the tubular support 1, relief clearances in the form of depressions 6 are introduced into the bearing pin 4. The mechanical strength of the bearing pin 4 is thus not impaired, even in the region of the crimp, this being associated with an increase in the reliability and quality of the interlocking connection between the bearing pin 4 and tubular support 1.

As can be seen in more detail in FIG. 6, the outer contour 5 of the bearing pin 4, which is designed as a hollow body in this exemplary embodiment, even before the crimp is introduced, runs along the entire circumferential surface of the bearing pin, which is inserted into the tubular support 1, so as to correspond to the inner contour 3 of the tubular support 1 after the crimping operation. This ensures that the tubular support 1 can be fitted on the wiper bearing even with large tolerances. It is namely no longer necessary, as in the prior art, to position the crimping tool precisely onto a region of the bearing pin, in which crimping pockets are possibly provided, in order to introduce the crimp.

In this exemplary embodiment, the crimping geometry has been selected in such a manner that the bending resistance is formed differently in the X and Y axes, i.e. the moment of resistance $B_{WX} > B_y$, since $B_{WX}$ in this exemplary embodiment lies in the main loading direction of the connection between the bearing pin 4 and tubular support 1.

In order to determine the optimum outer geometry 5 of the bearing pin 4, a method according to the invention proposes first of all deforming the tubular support 1 according to FIGS. 1 and 2 with a crimping tool in order to determine the inner contour 3 of the tubular support 1 after the crimping. Subsequently, a stress-optimized outer contour 5 of the bearing pin 4 is calculated with reference to the resultant inner contour 3 of the tubular support 1, and a bearing pin 4 is produced in such a manner that the latter has an outer contour 5 which, even before the crimp is introduced, is formed in a region of overlap with the crimp so as to correspond to the inner contour 3 of the crimped tubular support 1. A depression 6 is provided as a relief clearance on the bearing pin 4, the depression being formed in the region of maximum material expansion or material stress applied to the material of the bearing pin 4 by the inner contour 3 of the tubular support 1. The effect achieved by this is that, during the crimping operation, the portion of elastic deformation of the inner contour 3 of the tubular support 1 in the bearing pin 4 is also maintained and therefore the elastic deformation of the tubular support 1 does not have to be absorbed by the material of the bearing pin 4 but rather is already absorbed by the depression 6.

The tubular support 1 is subsequently pushed onto the bearing pin 4 modified in this manner, and the crimping mechanism is pushed together in such a manner that the tubular support 1 is deformed by the force $F_{crimp}$ of the crimping punches 2. Upon plastic deformation of the tubular support 1 and elastic deformation of the bearing pin 4, a surface contact K thus arises in the connecting region between the tubular support 1 and bearing pin 4 according to FIG. 6.

The effect furthermore achieved by the bone- or butterfly-shaped structure of the bearing pin is that, after the crimping, a stable contact region is provided in the region of the turning points 9 of the bending of the tubular support 1, said contact region being formed in the bearing pin 4 as the stated sacrificial geometry in order, here too, in the event of a maximum force which can be absorbed by said region in the bearing pin 4 being exceeded, to achieve compensation, without overloading, by movement of the sacrificial geometry into the region of the depression 6. Plastic is preferably selected as the material for forming a bone- or butterfly-shaped bearing pin. Of course, it is also possible to produce the bearing pin 4 in this case from aluminum or another material which has a lower modulus of elasticity than the modulus of elasticity of the tubular support 1. Owing to the possibility of absorbing crimping forces, the bearing pin 4 is insensitive to crimping depth tolerance deviations in the outer contact region. By means of increasing the contact angle α to approximately 90°, the normal force acting on the contact region is minimized and the tensile loading in the wall points of the tubular support 1 during and after the crimping is reduced to 9%, and therefore the risk of overloading of the wall regions 9 of the tubular support and of the bearing pin 4 can be reduced or can even be virtually completely prevented.

The invention claimed is:

1. A method for producing a windshield wiper apparatus for a motor vehicle, with a wiper motor and with at least one wiper bearing in which a wiper shaft is mounted, the wiper shaft being driven by means of the wiper motor in order to actuate a wiper arm connected to the wiper shaft, wherein the wiper bearing has a bearing pin (4) for receiving a tubular support, which bearing pin is fixed on the tubular support by means of crimping, characterized in that, for the production of a stress-optimized connection between the tubular support and the bearing pin (4), the method comprises the following steps:
crimping a first tubular support with one or more crimping tools, without the bearing pin (4) being disposed in the tubular support;
determining an inner contour (3) of the first tubular support, the inner contour arising as a result of the crimping;
calculating a stress-optimized outer contour (5) of the bearing pin (4) on the basis of the inner contour (3) of the first tubular support after the crimping of the first tubular support;
producing the bearing pin (4) in such a manner that, even before a second tubular support is pushed onto the bearing pin (4), said bearing pin has the outer contour (5) which is formed, at least in a region in which the bearing pin will overlap with crimping of the second tubular support, so as to correspond to the inner contour (3) of the first tubular support after the crimping of the first tubular support;
pushing the second tubular support onto the bearing pin (4); and
crimping the second tubular support onto the bearing pin with the same one or more crimping tools used to crimp the first tubular support.

2. The method as claimed in claim 1, characterized in that at least one relief clearance (6) is provided in regions of great stresses which may occur on the outer contour (5) of the bearing pin (4).

3. The method as claimed in claim 1, characterized in that the crimping takes place via at least two separately adjustable crimping tools (2) in order to be able to adapt the crimping to a loading direction of the wiper bearing.

4. The method as claimed in claim 1, characterized in that at least one relief clearance (6) is provided in regions of great stresses which may occur on the outer contour (5) of the bearing pin (4) in a region of surface contact with the inner contour (3) of the second tubular support.

5. The method as claimed in claim 1, wherein the step of producing the bearing pin (4) includes forming the outer contour (5) of the bearing pin (4) along an entire circumferential surface thereof so as to correspond to the inner contour (3) of the first tubular support after the first tubular support has been crimped.

6. The method as claimed in claim 1, wherein the step of producing the bearing pin includes forming the bearing pin in such a manner that a surface contact (K) between an inner contour (3) of the second tubular support and the outer contour (5) of the bearing pin (4) is formed only in the region of a crimping base formed during the crimping of the second tubular support onto the bearing pin (4), and the second tubular support is otherwise spaced apart from the bearing pin (4) after being crimped onto the bearing pin (4).

7. The method as claimed in claim 1, wherein the step of producing the bearing pin (4) includes forming the outer contour (5) of the bearing pin (4) along an entire circumferential surface thereof so as to correspond to the inner contour (3) of the first tubular support after the first tubular support has been crimped, and wherein the second tubular support adopts the same inner contour (3) as the inner contour (3) of the first tubular support after the second tubular support is crimped onto the bearing pin (4).

\* \* \* \* \*